UNITED STATES PATENT OFFICE.

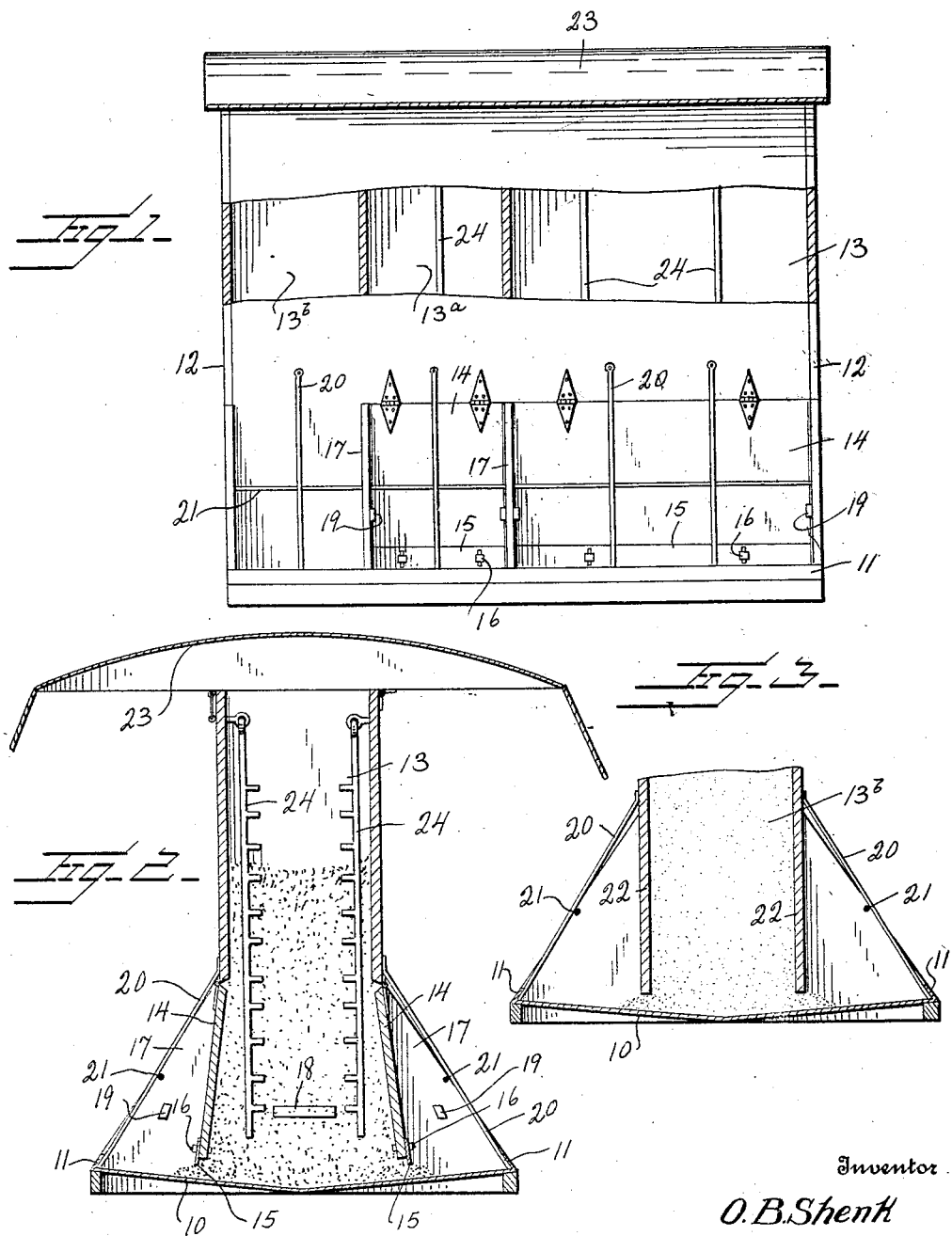

OTHO B. SHENK, OF ELIDA, OHIO.

HOG-FEEDER.

1,304,107.      Specification of Letters Patent.      Patented May 20, 1919.

Application filed January 13, 1919. Serial No. 270,914.

*To all whom it may concern:*

Be it known that I, OTHO B. SHENK, a citizen of the United States, residing at Elida, in the county of Allen and State of Ohio, have invented certain new and useful Improvements in Hog-Feeders, of which the following is a specification, reference being had to the accompanying drawings.

This invention relates to self feeding troughs or like devices for feeding animals, and particularly to that class of devices of this character wherein a bin or container discharges into a subjacent trough, the rate of discharge from the bin into the trough being controlled by doors or like instrumentalities.

The general object of this invention is to provide a feeder of the character above described so designed that the food contained within the bin or container will not pack but will feed down as wanted and in this connection a further object is to provide a construction such that the efforts of the animal to get at the food within the trough will cause the downward movement of the feed.

A further object is to provide a construction of this character in which the discharge from the bin or container into the trough is regulated by swinging doors or gates, having their free edges spaced from the bottom of the trough and which will normally be urged to an outwardly and downwardly inclined position by the pressure of the food in the bin container.

Still another object is to provide an adjustable strip on the lower edge of each of said discharge controlling doors which strip may be adjusted nearer to or farther from the floor of the trough to adapt the bin to be used with different feeds.

Still another object is to provide a feeder having a plurality of different bins or compartments, each with its own feed controlling door or equivalent member, so that different feeds may be discharged from the feeder and to provide means whereby the hogs or other animals shall be prevented from crowding each other out of position.

Another object is to provide means whereby the inward or outward swinging movement of the doors or gates is limited.

Still another object is to provide means for preventing the hogs or other animals from getting their feet into the feed trough.

Other objects will appear in the course of the following description.

My invention is illustrated in the accompanying drawings, wherein:—

Figure 1 is a front elevation of my improved feeder partly in section;

Fig. 2 is a vertical transverse section taken through the compartment 13; and

Fig. 3 is a vertical transverse section taken through the compartment $13^b$.

Referring to these drawings, it will be seen that my improved feeding device consists of a trough 10, which forms the base of the feeding device, the floor of this trough preferably extending slightly upward and outward from a middle line and the outer edges of the trough being formed with upwardly extending flanges or walls 11. The end walls 12 of the trough support a plurality of connected compartments or bins illustrated as three in number, 13, $13^a$ and $13^b$. These compartments may be of different capacities or of the same capacity and any number of compartments may be provided.

The lateral edges of the walls 12 are upwardly inclined from the side edges of the trough to the lower portions of the bins. The bins are open at their lower ends so as to discharge into the trough and hinged to the side walls of the bins 13 and $13^a$ and extending downward therefrom are the gates or doors 14. These gates or doors 14 are so hinged to the side walls of the several bins that they may swing both outward and inward from a vertical plane and the lower edges of these doors are spaced from the bottom of the trough, preferably a distance of about three inches. To the lower edge of each of the doors 14 is attached a strip 15, this strip being formed with slots through which the bolts 16 pass, these bolts holding the strips to the doors, but permitting the strips to be adjusted to project to various distances below the lower edges of the doors and thus regulate the effective distance between the lower edges of the doors and the bottom of the trough, this adjustment being required by differences in the feed being discharged.

The trough is also divided by partitions 17, these partitions coinciding with the position of the partitions between the several bins or compartments. Preferably these partitions 17 and the end walls 12 carry upon them stops 18 controlling the inward swing of the doors 14 and stops 19 limiting the outward swing of the doors.

Extending upward at spaced intervals from the outer edges of the trough and extending to the side walls of the bins, are the upwardly inclined rods 20 which are equidistantly disposed and form means to keep the hogs from crowding each other, while extending longitudinally along each side of the feeder and attached to the end walls and to these rods 20 or in any suitable manner are the longitudinal rods or members 21 which prevent the hogs from getting their feet into the trough. I have illustrated the compartment 13$^b$ as not being provided with the doors 14, but as having its side wall extended straight down as at 22 nearly to the bottom of the trough. This compartment 13$^b$ is designed for holding feeds which do not tend to pack and that feed downward easily without force.

When the compartments 13 and 13$^a$ are filled with feed, this feed meets with no obstruction in its downward movement, but tends to force outward on the doors 14 as illustrated in Fig. 2, so that these doors are held at an outward and downward inclination. The feed also tends to be forced out beneath the lower edges of the doors and as the hogs eat the feed as it rolls from under the doors, the feed within the compartments will move downward. If for any reason the feed should chance to pack within the compartments or bins, so that it does not feed outward beneath the doors, then the hogs will push the doors inward in their effort to get at the feed and as the snouts of the hogs will be forced below the doors they will undermine the feed so that thus the feed within the compartments 13 and 13$^a$ will be continually fed downward without obstruction.

By controlling the effective distance between the free edges of the doors and the bottom of the trough, the doors may be arranged for any desired character of grain or other feed and even corn on cobs may be properly fed in a feeder of this character without any waste. The obstruction 21 prevents the hogs from getting their feet in the trough and inasmuch as the doors cannot move inward beyond the stops 18, the hogs cannot push through the doors and into the trough, thus raising the doors inward and obstructing the feed. With my feeder, the feed does not tend to clog or pack as it would do were the lower ends of the bins contracted, thus obstructing the downward flow of the feed. With feeders constructed in accordance with my invention, even corn on the cob may be fed to the hogs and the corn will feed downward properly without regard as to whether the corn is longitudinal of the bin or transverse thereto.

While I do not wish to be limited to this detail, I preferably provide a roof 23 wider than the bins so as to cover the trough, this roof being hinged to the upper ends of the bins so as to permit it to be raised and the bins filled. This roof, as will be seen from Fig. 2, extends downward and outward on each side so as to form a rain shield to prevent rains from blowing into the feed trough. I preferably suspend within the bin the feed agitators 24 which are pivotally mounted at their upper ends and depend through the length of the bin and are preferably formed with fingers or protuberances. When the doors or gates 14 are forced inward by an animal, these gates will strike the free ends of the agitators and cause them to shift and swing so as to agitate the feed and prevent it from clogging. Furthermore, when the hogs get their noses beneath the doors 14 and root around in the feed, they will strike these agitators and shift them, thus preventing the feed from clogging. It is obvious that many minor changes may be made in the details of construction and arrangement of parts, without departing from the spirit of the invention as defined in the appended claims.

I claim:—

1. A feeder of the character described comprising a relatively wide trough, a plurality of bins mounted above the trough and having substantially vertical side walls extending downward but having their lower edges spaced from the trough, the bins being less in width than the width of the trough, freely swinging gates hinged to the lower edges of the side walls of the bin and depending into the trough but spaced therefrom, partitions dividing the trough to correspond with the bins, a plurality of bars attached to the edges of the trough and extending upward and inward from the bins and attached to the lower edges of the side walls thereof whereby to divide the space above the trough into a plurality of feeding spaces and brace the lower edges of the side walls from the margins of the bin, and longitudinal members intersecting said upwardly and inwardly extending bars and attached thereto and acting as impediments to the animals feeding from the trough.

2. A feeder of the character described comprising a trough, a bin mounted upon the trough and having substantially vertical walls, the bin being less in width than the width of the trough, freely swinging gates hinged to the lower edges of the side walls of the bin and depending into the trough but spaced therefrom, and agitators swingingly supported at their upper ends upon the side walls of the bin and depending into the trough behind the gates and freely swinging in all directions whereby to cause the swinging of said agitators upon a swinging movement of the gates.

In testimony whereof I hereunto affix my signature in the presence of two witnesses.

OTHO B. SHENK.

Witnesses:
ABNER BRENNEMAN,
S. D. CURTIS.

Copies of this patent may be obtained for five cents each, by addressing the "Commissioner of Patents, Washington, D. C."